United States Patent Office 3,723,369
Patented Mar. 27, 1973

3,723,369
VINYL HALIDE RESINS PLASTICIZED WITH AN ACYLATED POLYESTER OF A DIBASIC ACID AND A MIXTURE OF GLYCOLS
John T. Lutz, Jr., Cornwells Heights, and Constance A. Lane, Philadelphia, Pa., assignors to Rohm and Haas Company, Philadelphia, Pa.
No Drawing. Filed Dec. 1, 1971, Ser. No. 205,710
Int. Cl. C08f 21/04; C08g 17/16
U.S. Cl. 260—22 CB          3 Claims

ABSTRACT OF THE DISCLOSURE

Compositions of improved low temperature service properties comprise a vinyl halide resin and a polyester of the formula $$AcG(AG)_nAc$$

wherein Ac represents a monobasic acyl radical containing 2 to 18 carbon atoms, G is the residue of a mixture of 1,2-propylene glycol, 1,4-butylene glycol and dipropylene glycol, A is the residue of a dibasic acid which is at least one saturated aliphatic dibasic acid having an alkylene chain of 4 to 10 carbons and $n$ is such that the resulting polyester is characterized by a number average molecular weight in the range of 1500 to 4000 as determined by vapor phase osmometry in benzene solution.

---

This invention relates to plasticized vinyl halide resin compositions. More particularly, this invention relates to vinyl chloride resins plasticized with an acylated polyester.

In general, vinyl resins are hard, tough, and frequently brittle compositions which are not particularly useful without some modification. Useful compositions can be provided by compounding the vinyl resins with softening agents or plasticizers. The resulting compositions may have favorable characteristics such as flexibility and elongation coupled with toughness.

Polyester oligomers have been found to be particularly useful for plasticizing vinyl halide resins particularly poly(vinyl chloride) (PVC). Thus Wilkinson et al., U.S. Pat. 2,815,354, teaches plasticizing vinyl resins with liquid acylated polyesters of a glycol and a dibasic acid and Bond et al., U.S. Pat. 3,129,816 shows a pressure-sensitive vinyl plastic insulating tape wherein the vinyl plastic may be PVC plasticized with a polyester which may be an acylated polyester of a glycol selected from at least one of 1,2-propylene glycol, 1,4-butane diol and 1,6-hexane diol and a dibasic carboxylic acid.

In the present invention it has been found that the low temperature service properties of compositions such as those disclosed by Wilkinson et al. and Bond et al. can be substantially improved by deriving the vinyl chloride resin modifier from a particular monomer mixture of glycols including dipropylene glycol. The present invention is described as a composition of improved low temperature service properties comprising a vinyl halide resin and a polyester of the formula $$AcG(AG)_nAc$$

wherein Ac represents a monobasic acyl radical containing 2 to 18 carbon atoms, G is the residue of a mixture of 1,2-propylene glycol, 1,4-butylene glycol and dipropylene glycol, A is the residue of a dibasic acid which is at least one saturated aliphatic dibasic acid having an alkylene chain of 4 to 10 carbons and $n$ is such that resulting polyester is characterized by number average molecular weight in the range of 1500 to 4000 as determined by vapor phase osmometry in benzene solution. Preferably the polyester is characterized by a molecular weight in the range of 2000 to 3200.

Although generally, dipropylene glycol polyadipates are incompatible with PVC and exhibit extreme sensitivity to water and high humidity spew, it has been found that incorporation of small amounts of dipropylene glycol units into a 1,2-propylene glycol/1,4-butylene glycol polyester produces a modifier which imparts improvement in low temperature flexibility to vinyl chloride compositions without adversely affecting the water sensitivity or high temperature spew properties. The vinyl chloride compositions of this invention are particularly useful as insulating compositions or in electrical tape formulations.

The polyester plasticizer of the present invention may be prepared by mixing all of the ingredients (glycols, dibasic acids and monobasic acids) together before heating or by first esterifying one mole of the aliphatic dicarboxylic acid of 4 to 10 carbon atoms or mixtures thereof with an amount in excess of one mole of the mixture of 1,2-propylene glycol, 1,4-butylene glycol and dipropylene glycol. The excess of the mixture of glycols may range from 10% to 200%, preferably in the range of 15 to 40%, of the requisite equimolar amount. The resulting polyester mixture, which contains mainly a low molecular weight polyester having a hydroxyl group at each end, is treated with the requisite amount of the monocarboxylic acid of 2 to 18 carbon atoms or mixtures thereof. The excess glycol is removed under vacuum to yield the final product containing an acyl group at both ends of the polyester molecule. An optional final treatment with acetic anhydride may be employed to esterify any remaining hydroxyl groups in the molecule.

The method of preparation consists of the following steps: (1) The initial esterification at atmospheric pressure, which may include acylation with a monocarboxylic acid, (2) heating in vacuo, and (3) chain ending or acylation of the end hydroxyl groups if not already included in step 1. To insure complete esterification, the initial esterification reaction is carried out with an excess of glycols consisting of a mixture of dipropylene glycol with 1,4-butylene glycol and 1,2-propylene glycol in which 10 to 30 mole percent of the total glycol content is composed of dipropylene glycol. The dipropylene glycol is preferably a mixture of all three possible isomers, i.e., the primary-secondary glycol, the diprimary glycol and the disecondary glycol. The dicarboxylic acid component in the esterification may be a single dicarboxylic acid or a mixture of two different dicarboxylic acids. Furthermore, a monocarboxylic acid or a mixture of monocarboxylic acids may be incorporated in the initial esterification mixture, along with the dicarboxylic acid or mixtures thereof; or a monocarboxylic acid may be added at an intermediate state in the initial esterification prior to heating in vacuo; or, finally, the monocarboxylic acid may be added after the initial esterification and after heating in vacuo. A final heating is carried out under vacuum and in the presence of a transesterification catalyst to effect release of excess glycol and to allow molecular weight increase to the desired level.

The initial polyesterification is conducted at a temperature ranging from 100 to 250° C., preferably at about 130–220° C., for at least 2 hours in an inert atmosphere, such as dry oxygen-free nitrogen and with any suitable means for the removal of water as it is formed.

The esterification reaction may be carried out in the presence of a catalyst, such as p-toluenesulfonic acid. However, it has been observed that esterification proceeds equally well in the absence of catalyst. A decolorizing charcoal may be employed during the esterification or during the heating in vacuo to improve materially the color of the polyester.

The vacuum treatment is carried out in a nitrogen atmosphere at such temperatures that all volatile materials, including the excess of glycols, are removed by distillation, preferably at a temperature ranging from 150 to 300° C., and at a pressure of 10 mm. of mercury or less for periods of 1 to 4 hours. To effect release of the excess glycols during the vacuum treatment, the presence of a transesterification catalyst, such as zinc chloride, litharge, dibutyl tin oxide, aluminum isopropoxide, is required. The residue, after removal of the excess glycols, is the desired product and is a light colored resin or viscous oil. If not previously terminally acylated, the liquid is charged into a reaction vessel equipped with stirrer, thermometer, take-off condenser and inlet for dry oxygen-free nitrogen. To the charge is added either a sufficient amount of a monocarboxylic acid of 2 to 18 carbon atoms or a sufficient mixture of different acids to react with the residual free end hydroxyl groups. The charge is stirred at room temperature and then heated at a temperature ranging from 100 to 300° C. to complete the acylation and, subsequently, to remove the excess acid or mixture of acids by distillation. The product is then heated in vacuum under nitrogen at 200–250° C. and at a pressure below 10 mm. of mercury. If further reduction in the hydroxyl number is desired, the product may be treated with acetic anhydride.

The mole ratio of 1,2-propylene glycol to 1,4-butylene glycol in the glycol mixture may vary from 40:60 to 60:40. The dipropylene glycol fraction may vary from 10 to 30 mole percent of the total mixture.

A dicarboxylic acid or anhydride of 4 to 10 carbon atoms may be used to esterify the glycol mixture. The following are examples of suitable acids or anhydrides: glutaric, adipic, pimelic acid, o-phthalic anhydride, o-phthalic, isophthalic, succinic, suberic, azelaic, and sebacic acid. Adipic acid is preferred.

A monocarboxylc acid or anhydride of 2 to 18 carbon atoms, preferably 12 to 18 may be used to post-acetylate the polyester. The following are examples of suitable monocarboxylic acids or anhydrides: acetic acid or anhydride, caproic, caprylic, pelargonic capric, lauric, myristric, palmitic, stearic acids or commercially available mixtures of fatty acids obtained from vegetable or animal fats. The preferred monocarboxylic acid is hydrogenated coconut oil fatty acids consisting primarily of lauric and myristic acids. A typical sample of hydrogenated coconut oil fatty acids has an average composition as follows:

| | Percent |
|---|---|
| Caprylic acid ($C_8$) | 7 |
| Caproic acid ($C_{10}$) | 6 |
| Lauric acid ($C_{12}$) | 50 |
| Myristic acid ($C_{14}$) | 19 |
| Palmitic acid ($C_{16}$) | 9 |
| Stearic acid ($C_{18}$) | 8 |
| Oleic acid ($C_{18}$) | 1 |

The esters of the invention are valuable plasticizers for polyvinyl chloride resins. The term "polyvinyl chloride resin" refers to polymers containing a predominant quantity, that is, a quantity greater than 50%, generally over 60%, by weight of monomer as vinyl chloride units. This includes the homopolymers of the vinyl chloride as well as the copolymers and interpolymers of a vinyl halide and an unsaturated monomer copolymerizable therewith. Other monomers that may be copolymerized with the vinyl chloride include the vinyl type monomers such as, for example, those having a single —$CH_2$=C< group, such as vinylidene chloride, vinyl chloroacetate, chlorostyrene, chlorobutadienes, etc., and those copolymers of such vinyl compounds and other unsaturated materials copolymerizable therewith, for example, copolymers of a vinyl halide, such as vinyl chloride with such materials as vinylidene chloride, vinyl esters of carboxylic acids, for example, vinyl; acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding ester of methacrylic acid; vinyl aromatic compounds, for example, styrene; esters of $\alpha,\beta$-unsaturated carboxylic acids, for example, the methyl, ethyl, butyl, amyl, hexyl, octyl esters of maleic, crotonic, itaconic, fumaric acids and the like. Further useful copolymers are those obtained by the copolymerization of vinyl chloride with an ester of an $\alpha,\beta$-unsaturated dicarboxylic acid, such as diethyl maleate or other esters of maleic, fumaric, aconitic, itaconic acid, etc., in which 5 to 20 parts by weight of diethyl maleate or other analogous esters are used for every 95 to 80 parts by weight of vinyl chloride.

When the esters of the invention are employed as plasticizers for polyvinyl chloride resins, they are ordinarily incorporated into the vinyl chloride polymers by mixing the powdered resin with the liquid plasticizer followed by mixing and/or kneading and then by curing the mix at an elevated temperature, for example, within the range from 150° to 200° C., on hot rolls or in a heated mixer, such as a Werner-Pfleiderer or Banbury mixer. The proportion of esters that may be employed may vary over a great range since it is dependent on the particular ester of this invention which is selected, the specific polyvinyl chloride resin to be plasticized, and the final degree of plasticization desired in the resin—this factor in itself being dependent on the ultimate application intended for the resin. With these facts in mind, one skilled in the art may use the esters in a "plasticizing amount" for most purposes this being from about 5 to 100 parts, and more commonly from 20 to 60 parts, of ester per 100 parts of resin. In amounts exceeding 100 parts of ester per 100 parts of polyvinyl chloride resin, the esters of the invention are more commonly suitable for use in organosols and plastisols. One or more esters may be used in the polyvinyl halide resin.

In accordance with the invention, there may be employed one or more esters of this invention in polyvinyl chloride compositions; also, the esters of the invention may be employed as the sole plasticizer; or they may be employed in conjunction with conventional plasticizers, such as alkyl phthalates, alkyl phosphates, monomeric or polymeric epoxides, and other plasticizers known in the art.

With the polyvinyl chloride resin, there may be incorporated various stabilizers, fillers, dyes, pigments, and the like.

The following examples illustrate the present invention. All parts and percentages are by weight unless otherwise specified.

EXAMPLE 1

This example illustrates the preparation of a plasticizer of the present invention.

Charge (A)

| | Grams |
|---|---|
| 1,2-propylene glycol | 376 |
| 1,4-butylene glycol | 446 |
| Dipropylene glycol | 307 |
| Adipic acid | 1400 |
| Hydrogenated coconut oil fatty acids | 122 |
| Triiso octyl phosphite | 0.4 |

(B)

| | |
|---|---|
| Litharge | 0.75 |

(C)

| | |
|---|---|
| Acetic anhydride | 75 |

Raw materials in (A) are charged to a three-liter three-neck flask equipped with a stirrer, thermometer, nitrogen sparge tube and fractionating column topped with a thermoregulator set for a maximum distillation temperature of 105° C. The reactants are heated with agitation under a mild nitrogen sparge to 140° C. when distillation of water begins. The temperature is raised to 210° C. as rapidly as the maximum vapor temperature of 105° C. permits. After 2 hours at 210° C., 92% of the theoretical amount of water has distilled off and the acid number is 25.

Partial vacuum is applied and the pressure reduced to 100 mm. Hg. After 4 hours at 210° C./100 mm. Hg the acid number is 7. The catalyst (B) is then added and full vacuum applied. After 10 hours at full vacuum, during which time the excess glycol is removed, the viscosity is 225 stokes (25° C.) (viscosity $Z_6+$ [G–H]) and the acid number is less than one. The hydroxyl number of this intermediate is 14. The reaction mixture is cooled to 150° C. while venting with nitrogen.

Acetic anhydride (C) is added and the reaction mixture held at 135–150° C. under nitrogen for one hour. Full vacuum is finally applied to remove the acetic acid and acetic anhydride. The final product has a viscosity of 205 stokes (25° C.) and the acid number and hydroxyl number are less than one. The molecular weight (number average by vapor phase osmometry) is 3000.

EXAMPLES 2 TO 4

The amount of fatty acid terminator can be varied to provide molecular weights of 2000–3500 without adversely affecting the performance of the resulting modifier. In this example all charges and the process are similar to Example 1.

|  | 2 | 3 | 4 |
|---|---|---|---|
| COFA (hydrogenated coconut oil fatty acids) gms. | 122 | 118 | 115 |
| Acid number | 1.0 | 1.3 | 1.8 |
| Viscosity (Stokes 25° C.) | 211 | 200 | 186 |
| Color (VCS) | 3 | 5 | 3+ |
| Hydroxyl number | 1.1 | 3.0 | 2.3 |
| Molecular weight | 3,100 | 3,000 | 2,800 |

EXAMPLES 5 TO 7

The following examples show the affect on the modifier of variations in dipropylene glycol content. The process is similar to that of Example 1 except that the dipropylene glycol (DPG) charge is varied with the following results:

|  | 5 | 6 | 7 |
|---|---|---|---|
| Mole percent DPG in glycols | 10 | 20 | 30 |
| Acid number | 1.0 | 0.9 | 0.8 |
| Viscosity (Stokes 25° C.) | 215 | 211 | 95 |
| Color (VCS) | 2+ | 3+ | 1+ |
| Hydroxyl number | 1.8 | 1.1 | 1.0 |
| Molecular weight | 3,110 | 3,100 | 2,675 |
| Freezing point, ° C. | +8 |  | −18 |

EXAMPLE 8

This example illustrates the incorporation of modifiers of this invention into poly(vinyl chloride) (PVC) compositions. In each case the 67 grams of plasticizer, 100 grams of PVC and 1.7 grams of stabilizer are milled together for 7 minutes at 325° F.

|  |  |  |  |  |
|---|---|---|---|---|
| Mole percent DPG in glycols | 0 | 10 | 20 | 30 |
| Shore A hardness [a] | 80–75 | 78–74 | 81–76 | 80–75 |
| T 135,000° C.[a] (Tf) | −12.5 | −13.5 | −14 | −15 |
| Percent Ivory Flakes extraction,[a] 24 hrs./90° C./percent | 2.0 | 2.0 | 2.0 | 4.3 |
| n-Hexane extraction [a] | 0.5 | 0.5 | 0.4 | 0.5 |
| Conditioned brittle point, ° C.[c] | −17 |  |  | −27 |

|  | Tape formulations* | | | |
|---|---|---|---|---|
| 75 mil molded slab., percent | 0 | 10 | 20 | 30 |
| Tf | −3.5 | −5.0 |  | −6.5 |
| Brittle point, ° C.[b]: |  |  |  |  |
|   Unconditioned [b] | −12 | −15 |  | −15 |
|   Conditioned [c] | −15 | −18 |  | −18 |
| 10 mil film tape formulations* (at −14° C.): |  |  |  |  |
|   Elastic mod. p.s.i.[a] | 207,000 |  | 197,000 |  |
|   Toughness, in lbs./in.[3] [a] | 5,000 |  | 9,500 |  |
|   Elongations 1 2/2 [a] |  | 100 | 205 |  |

[a] Methods R&H publication MR–80.
[b] ASTMD–746T.
[c] ASTMD–746T except samples conditioned at subfreezing temperature before testing.
*100 Geon 101 (PBC): 55 plasticizer; 4 lead salts stabilizer; 0.6 AC–629 (low MW polyethylene).

What is claimed is:
1. A composition of improved low temperature service properties comprising a poly(vinyl chloride) composition and a polyester of the formula

wherein Ac represents a monobasic acyl radical containing from 2 to 18 carbon atoms, G is the residue of a mixture of 1,2-propylene glycol, 1,4-butylene glycol and dipropylene glycol, wherein the mole ratio of 1,2-propylene glycol to 1,4-butylene glycol in the glycol mixture is from 40:60 to 60:40 and the dipropylene glycol mole percent of the total mixture is from 10 to 30 percent, A is the residue of a dibasic acid which is at least one saturated aliphatic dibasic acid having an alkylene chain of 4 to 10 carbons and $n$ is such that the resulting polyester is characterized by number average molecular weight in the range of 1500 to 4000 as determined by vapor phase osmometry in benzene solution.

2. The composition of claim 1 wherein Ac is a radical derived from hydrogenated coconut fatty acids and the aliphatic dibasic acid is adipic acid.

3. The composition of claim 1 wherein the polyester is characterized by number average molecular weight in the range of 2000 by 3200.

References Cited

UNITED STATES PATENTS

| 2,036,009 | 3/1936 | Wright | 260—873 |
| 2,815,354 | 12/1957 | Wilkinson et al. | 260—485 G |
| 3,129,816 | 4/1964 | Bond et al. | 117—80 |
| 3,227,665 | 1/1966 | Fourcade et al. | 260—873 |
| 3,367,894 | 2/1968 | Bruggeman | 260—22 CB |
| 3,376,242 | 4/1968 | Clemens | 260—22 CB |
| 3,520,844 | 7/1970 | Pontius et al. | 260—873 |

DONALD E. CZAJA, Primary Examiner

R. W. GRIFFIN, Assistant Examiner

U.S. Cl. X.R.

260—23 P